though the invention has been shown and described with respect to a preferred embodiment thereof.

United States Patent [19]
Schneider et al.

[11] 4,016,636
[45] Apr. 12, 1977

[54] COMPRESSOR CONSTRUCTION

[75] Inventors: Raymond P. Schneider, North Palm Beach; James F. Marshall, Lake Park; Maclean Crowell, Jupiter, all of Fla.

[73] Assignee: United Technologies Corporation, Hartford, Conn.

[22] Filed: Nov. 26, 1975

[21] Appl. No.: 635,558

Related U.S. Application Data

[62] Division of Ser. No. 491,030, July 23, 1974.

[52] U.S. Cl. .......................... 29/156.8 R; 29/464; 29/467; 415/189; 416/198 R; 416/201 R
[51] Int. Cl.² ...................................... B23P 15/04
[58] Field of Search ............ 29/156.8 R, 23.5, 464, 29/467, 468; 416/198, 198 A, 201; 415/189; 417/408

[56] References Cited
UNITED STATES PATENTS

| | | | |
|---|---|---|---|
| 2,272,831 | 2/1942 | Chalupa | 416/219 |
| 2,313,413 | 3/1943 | Weske | 415/198 |
| 2,619,318 | 11/1952 | Schaer | 416/219 |
| 2,650,017 | 8/1953 | Pedersen et al. | 416/201 |
| 3,385,568 | 5/1968 | Gray | 415/198 |
| 3,597,109 | 8/1971 | Petrie et al. | 416/198 A |

Primary Examiner—C.W. Lanham
Assistant Examiner—Daniel C. Crane
Attorney, Agent, or Firm—Jack N. McCarthy

[57] ABSTRACT

A compressor construction is shown, in combination with a jet engine, having a drum rotor with axially broached attachment slots therein. Blade sticks, each having an axial root shaped to fit the attachment slots and a platform which extends the length of the drum are positioned on said drum. Each blade stick has a plurality of blades located thereon, one for each stage of the compressor. A one-piece stator case with fixed cantilevered vanes is positioned over said drum rotor and blade sticks to form the completed compressor. A drum rotor has an integral shaft which is connected to a turbine. A method of assembling the compressor includes an assembly fixture on which the drum rotor can be positioned with the stator case and blade sticks being aligned so that they can be slid into place on the drum rotor.

2 Claims, 5 Drawing Figures

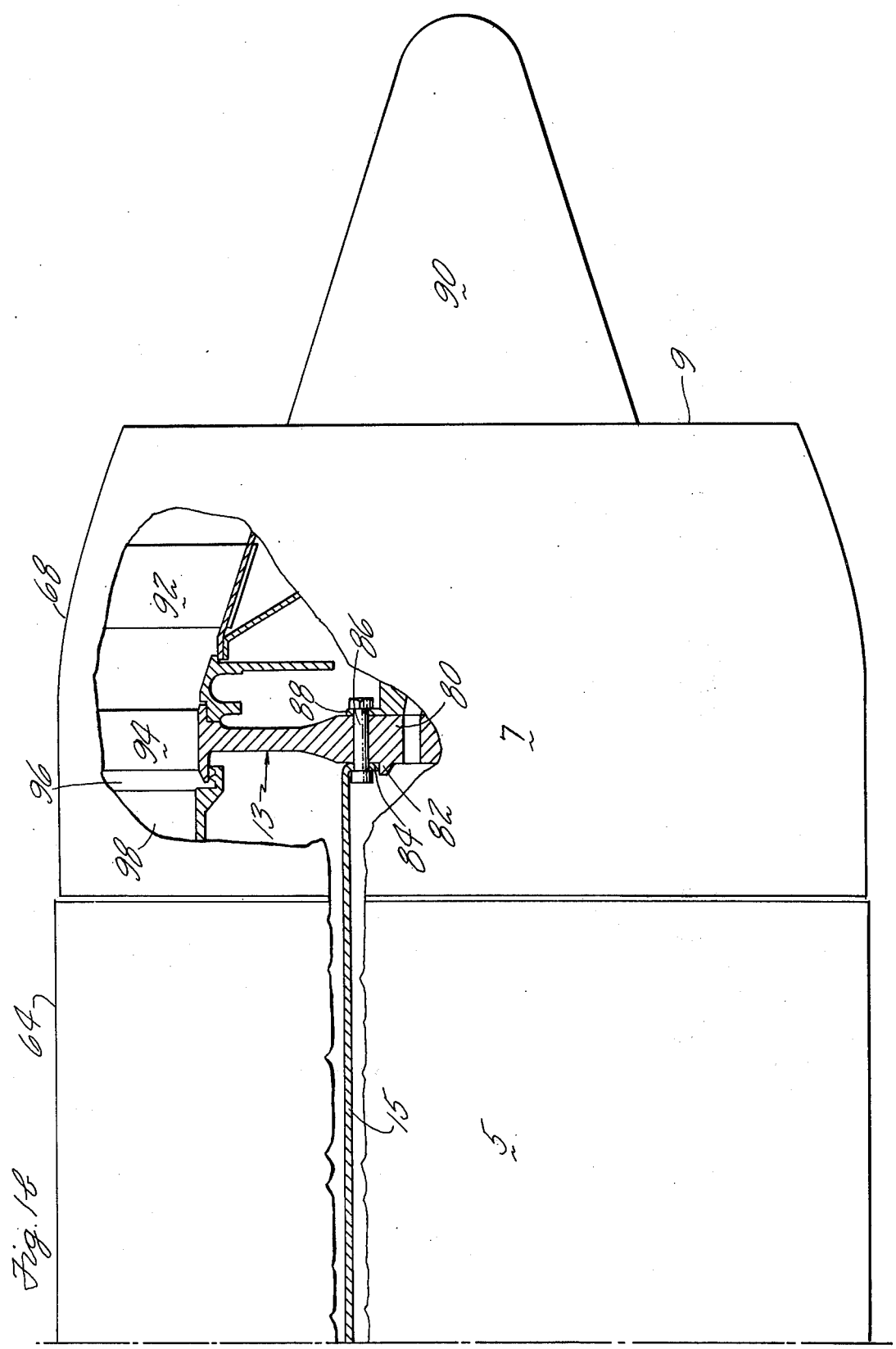

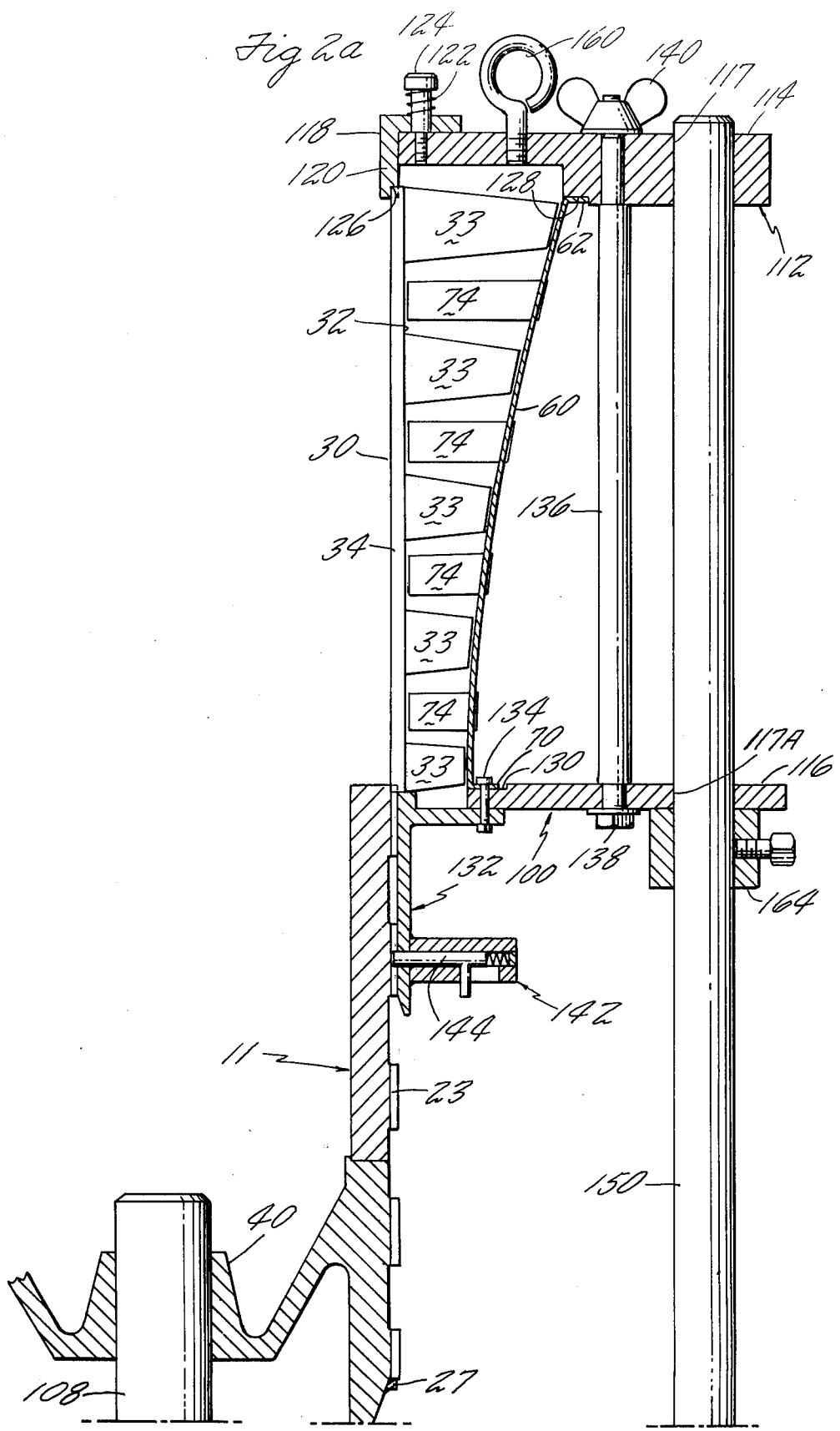

COMPRESSOR CONSTRUCTION

This is a division of application Ser. No. 491,030, filed July 23, 1974.

BACKGROUND OF THE INVENTION

This invention relates to multi-stage axial flow compressors which are precision aerodynamic pumps and which are costly to manufacture in order to provide the precision airfoil shapes and close operating tolerances necessary to attain state-of-the-art performance levels. Conventional designs are not economical when used in an expendable engine for a drone missile or a remotely piloted vehicle. In prior art constructions the precise methods and parts necessary result in expensive engines requiring a great deal of assembly time.

SUMMARY OF THE INVENTION

A primary object of the present invention is to provide a low cost engine compressor for ann engine which will provide performance levels sufficient to meet mission requirements.

In accordance with the present invention a compressor is formed from three basic elements: (1) a one-piece stator case with fixed cantilevered vanes, (2) a drum rotor and (3) blade sticks withh a plurality of airfoils attached along the length of each stick to form, with adjacent airfoils of adjacent blade sticks, each stage of the compressor. The stator case is connected to fixed structure on the engine and the drum rotor with attached blade sticks is mounted for rotation within said stator case.

A further object of this invention is to provide a drum rotor as a simple cylinder with axially broached slots for blade stick attachment.

Another object of this invention is to provide a method of assembling the compressor comprising an assembly fixture on which the drum rotor can be positioned with the stator case being axially aligned therewith, means being provided for placing the blade sticks in proper relation to the stator case, and with means for sliding said blade sticks and stator case into place on said drum rotor.

Another object of this invention is to provide an assembly fixture permitting positioning of the compressor elements thereon and then permitting relative movement to move the stator case and blade sticks over the drum rotor to their proper relative axial position for operation.

BRIEF DESCRIPTION OF THE DRAWING

FIG. 1b is a longitudinal view of the back half of a gas turbine engine broken away to show the turbine;

FIG. 2a is a sectional view of the top half of a compressor assembly fixture showing a compressor and drum rotor located thereon;

DESCRIPTION OF THE PREPARED EMBODIMENT

Figure 1A:
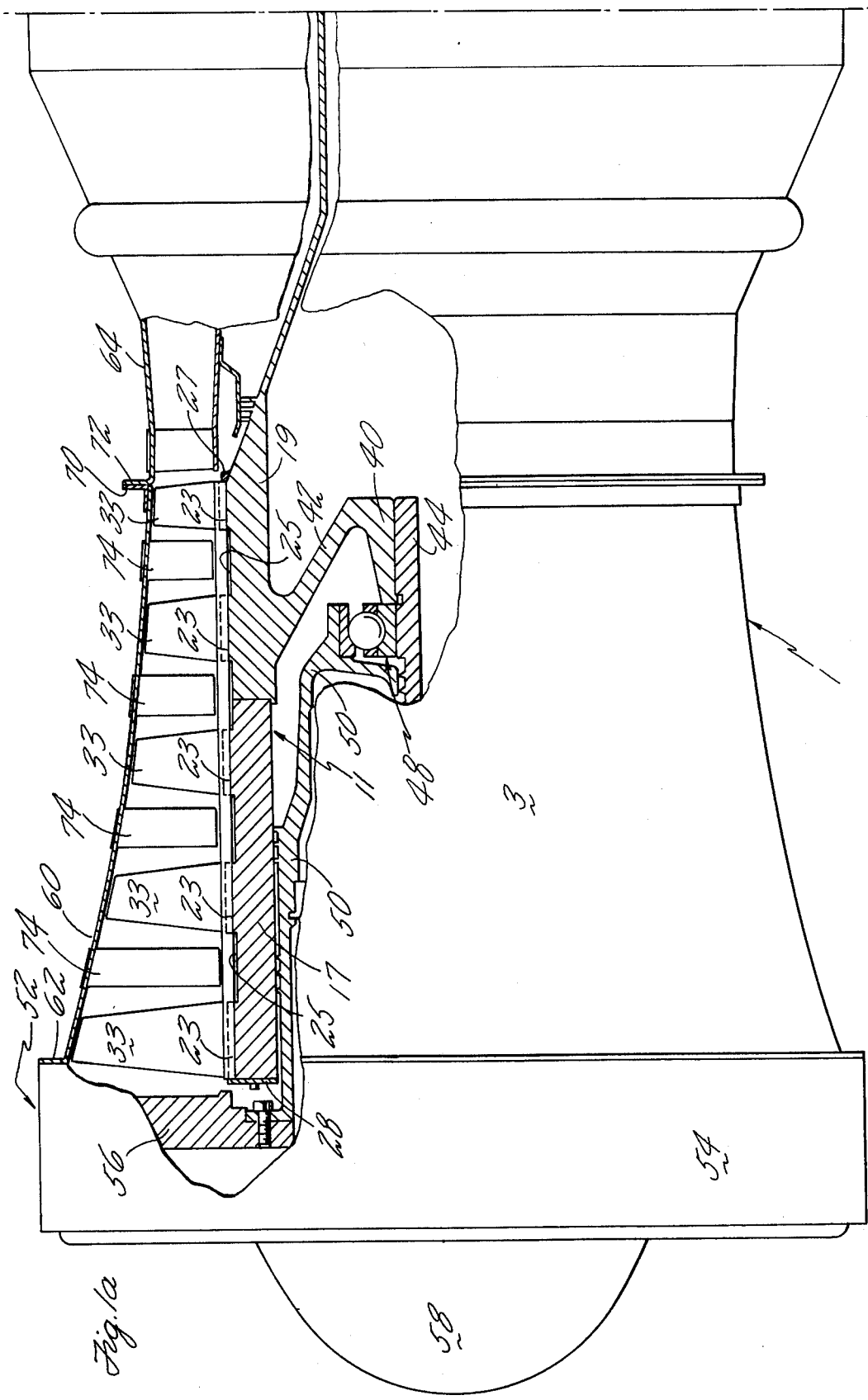
FIG. 1a is a longitudinal view of the front half of a gas turbine engine broken away to show the compressor.

In FIG. 1a and 1b a jet engine 1 is shown having a compressor section 3, a burner section 5, a turbine section 7 and exhaust nozzle 9. The compressor section 3 includes a drum rotor 11 having an integral connecting shaft 15 which is attached at its rear end to a turbine rotor 13.

The drum rotor 11 is constructed of two cylindrical sections 17 and 19 welded together at 21. While the drum rotor is shown in two pieces, it can be formed as a simple cylinder. The drum rotor is formed having a plurality of axially broached slots 23. Each slot is shown interrupted by a plurality of peripheral grooves 25, whose purpose will be hereinafter described.

Blade sticks 30 are formed having a long blade platform 32 which extends for the length of the compressor. Each blade stick platform 32 has an elongated blade root 34 which is contoured to mate with a broached slot 23. Each blade stick platform 32 is arcuate in cross section to form a ring around the drum rotor 11 with adjacent blade stick platforms 32. A ring 27 is welded on the drum rotor 11 against the rear ends of the slots 23 to form a fixed positioning stop for each blade stick 30. A removable ring 28 is bolted to the front of the drum rotor 11 to maintain the blade sticks 30 in place. In the blade stick 30 shown, five blades are axially aligned, with each blade forming one blade from each stage at the proper axial location of the stage.

Drum rotor 11 has a hub 40 which is fixedly positioned within the drum by an inwardly extending flange 42. Hub 40 is fixedly mouted on a shaft 44 which is mounted for rotation within a bearing assembly 48. Bearing assembly 48 is mounted in an inner housing 50 which extends rearwardly from a nose section 52.

The nose section 52 comprises a ring 54 having supporting struts 56 with a nose cone 58 fixed thereto. An annular inlet passage is formed between the ring 54 and nose cone 58 to permit air to flow to the forward end of the compressor.

The compressor section 3 includes a stator case 60 which extends over drum rotor 11. The front end of the stator case is fixed to the rear of the ring 54 by flange 62 while the rear of the stator case has a flange 70 which is fixed to a flange 72 on outer housing 64 which extends rearwardly over the burner section 5 to housing 68 which is located over the turbine section 7, terminating with its rearward end forming the outer surface of the exhaust nozzle 9.

The stator case 60 is formed having fixed cantilevered vanes 74 for location between each of the five stages of blades. For example, these vanes can be stabbed and brazed or welded to the case or can be retained in circumferentially machined slots in the inner diameter of the stator case. The stator case 60 itself can consist of fabricated sheet metal or machined from a rolled ring forging or centrifugal casting.

The turbine rotor 13 is formed having a hub 80 with an annular projecting 82 extending forwardly thereof. The rear end of the connecting shaft 15 has an inwardly extending flange member 84 which is positioned with its inner edge against the outer circumference of the projection 82. Bolts 86 extend through the flange 84 and hub 8C to fix the drum rotor 11 and turbine rotor 13 together.

The bolts 86 also extend through an annular flange 88 which is connected to a bearing assembly mounted within fixed structure of the tail cone 90. The tail cone 90 is fixed to housing 68 by fixed struts 92.

The turbine rotor 13 has turbine blades 94 fixed around the periphery thereof which extend into an axial flow path 96 which extends rearwardly of the turbine vanes 98 located rearwardly of the burner section 5. Gas from the burner section 5 passes over the vanes 98 through the blades 94 and over struts 92 out the exhaust nozzle 9.

The compressor can be assembled in different ways.

One method is to fix the drum rotor 11 in position, place individual blade sticks 30 with their blades between stators 74 of the stator case 60, with the blade stick roots 34 just positioned in the end of the broached slots 23 of the drum rotor 11. The stator case 60 and blade sticks 30 are then moved relative to the drum rotor 11 until the stator case 60 and blade sticks 30 are placed in a proper axial position with respect to the drum rotor 11. The drum rotor 11 is then mounted in place on shaft 44 and the stator case 60 is connected to the ring 54 by flange 62 and to outer housing 64 by flange 70.

An alternate method of assembly blade sticks 30 into slots 23 of drum rotor 11 is to eliminate a line of fixed vanes 74 creating an axial loading space for blade sticks 30. The drum rotor 11 could then be rotated to line up a slot 23 with the axis loading space and a blade stick 30 for that slot can be put in place. The vanes 74 which were eliminated to create the axial loading space could be then put in place by placing them in position through the stator case 60.

To accomplish the first method set forth above, an assembly fixture 100 is provided which comprises two main parts, (1) a base unit 102 for holding the drum rotor 11 and (2) a movable fixture 112 for holding the stator case 60 and blade sticks 30. The base unit 102 comprises a base plate 104 having a drum rotor and shaft holder 106. The drum rotor and shaft holder 106 comprises an upstanding rod 108 fixed to the base plate 104 and having an annular raised portion 100 fixed to the base plate 104 where the rod 108 extends from the base. The rod 108 is of such a length so that during compressor assembly the hub 40 of the drum rotor 11 is positioned over the free end of the rod 108 while the flange member 84 of the shaft 15 is positioned with its inner edge against the outer circumference of the raised portion 110.

The movable fixture 112 comprises a stator case and blade stick holder which includes an upper plate 144 and a lower plate 116. The upper plate 114 is annular and has three positioning guide holes 117 located adjacent its outer periphery. A plurality of spring loaded blade stick retainers 118 are located around the upper plate adjacent its inner periphery, there being one retainer 118 for each blade stick 30. A blade stick retainer 118 comprises an angle member 120 which has one side spring biased against the upper plate 114 by a spring 122 mounted on a rod 124 which guides the movement of the retainer 118 while the other side projects downwardly against the inner periphery below the lower face of the upper plate at that point to engage and retain one end of a blade stick 30 in a manner to be hereinafter described. The free end of the side of the retainer 118 which engages the blade stick has a notch 126 therein to receive a portion of the blade stick root 34. An annular recess 128 is positioned on the lower side of the upper plate to receive the flange 62 of a stator case 60. The inner portion of the upper plate 114 is of reduced thickness from this recess 128 to the inner periphery where the retainers 118 are located.

Figure 2B:
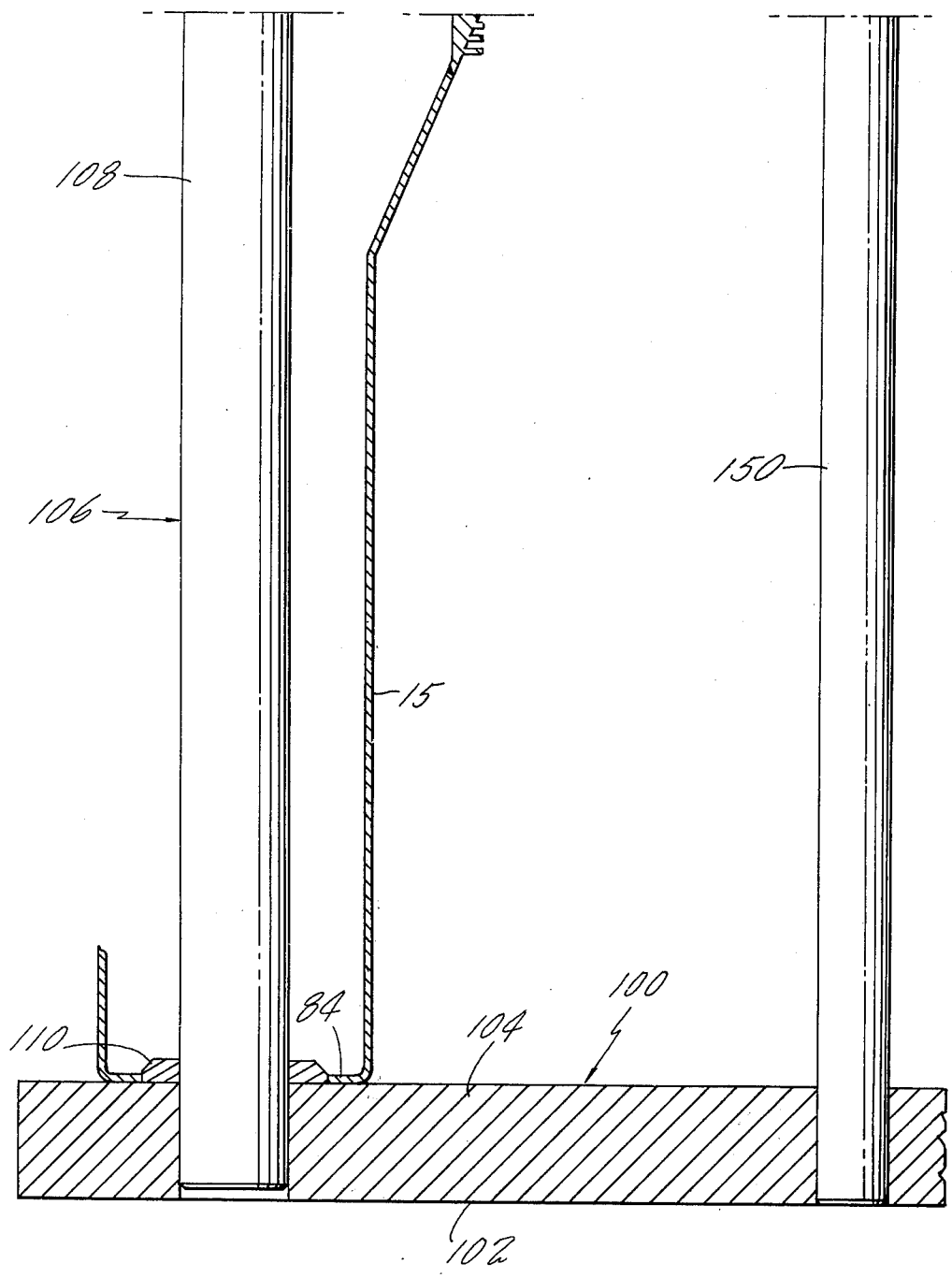
FIG. 2b is a sectional view of the bottom half of a compressor assembly fixture showing the compressor shaft.
Figure 3:
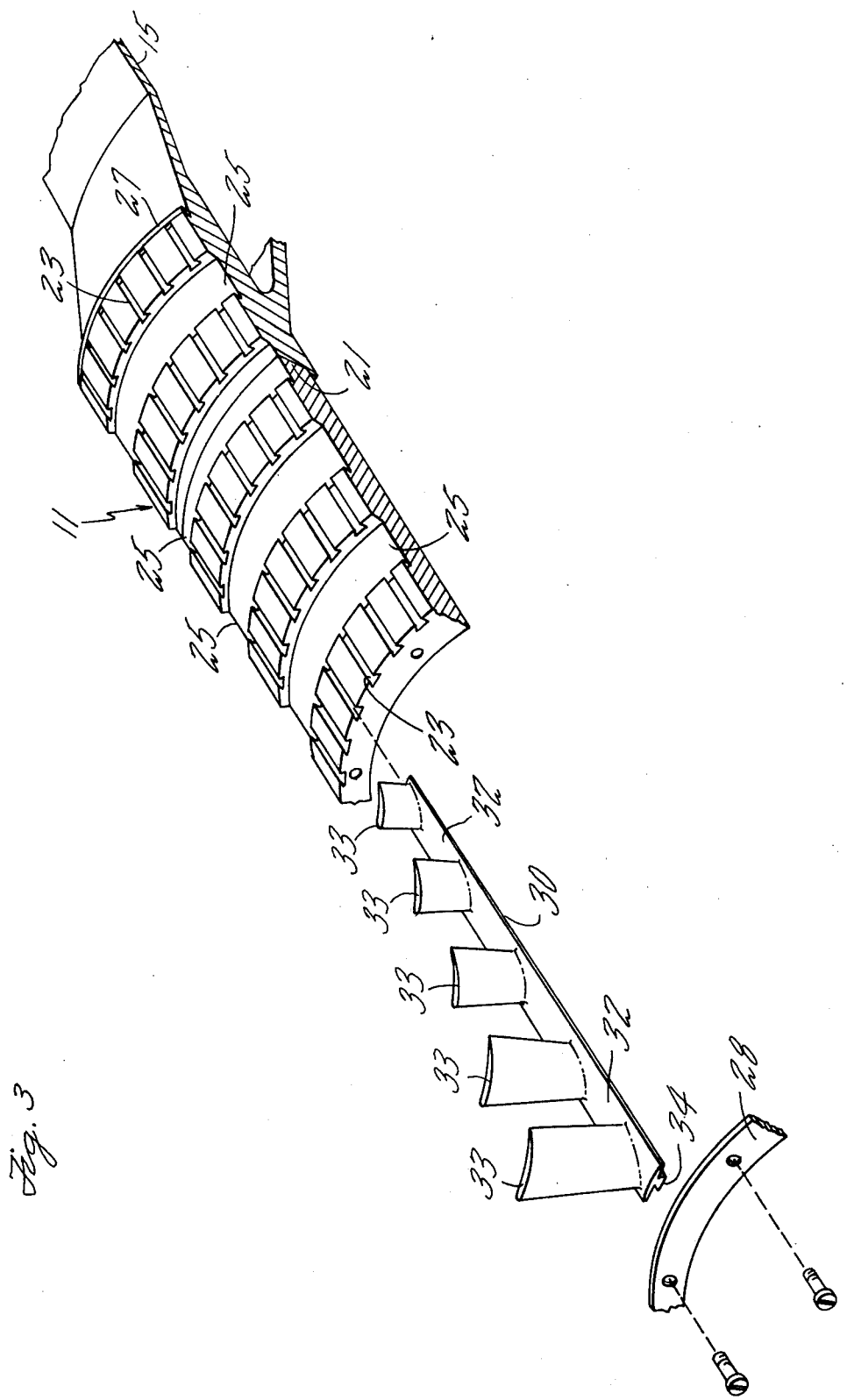
FIG. 3 is an exploded view showing one blade stick, a section of the compressor drum rotor, and a section of the holding ring.

Lower plate 116 is formed having an annular plate with a notch 130 located around the upper surface its inner periphery for receiving the flange 70 of a stator case 60. The annular plate has three positioning guide holes 117A which during use, are aligned with the positioning guide holes 117 of upper plate 114. An annular blade stick end stop 132 is fixed to the inner edge of the lower surface of the annular plate and extends inwardly therefrom. In use, a bolt 134 fixes the flange 70 of a stator case, the lower plate and the blade stick end stop 132 together (See FIG. 2a). A plurality of plate spacing members 136 are located between the plates so that they are positioned at the proper distance apart during use of the assembly fixture 100 so that the fixture does not put stress upon the stator case 60. The plate spacing members 136 are held in place by through-bolts 138 having wing nuts 140.

The blade stick end stop 132 has an alignment pin means 142 which has a pin 144 which is spring biased to extend inwardly from said stop 132 for the depth of the slots 23. This alignment pin 144 permits the blade sticks to be properly aligned with the slots 23 when their ends are supported by a retainer 118. Three guide rods 150 extend upwardly from the base plate 104 to engage the opening guide holes 137 and 137A, respectively, in the upper plate 114 and lower plate 116.

In operation, the drum rotor 11 is first positioned on the base unit 102, and the stator case 60 with its cantilevered vanes 74 is then mounted on the movable fixture 112 between the upper plate 114 and the annular plate of lower plate 116. The blade stick end stop 132 is then fixed by bolts 134 to the annular plate and the stator case. The plate spacing members 136 are then put in place by the through-bolts 138 and wing nuts 140 and tightened in position. The movable fixture 112 is then lifted by a plurality of eyelets 160, which extend upwardly from the top of the upper plate 114, and placed over the base unit 112 and lowered so that the opening guide holes 137A of the lower plate 116 are aligned with the guide rods 150, the movable fixture 112 is lowered until the blade stick end stop 132 has its pin 144 aligned to engage the proper slot 23 in drum rotor 11. The movable fixture 112 is then lowered until the guide holes 137 in the upper plate 144 engage the three guide rods 150 and then it is lowered to a point so that the top of the blade stick end stop 132 is just below the upper end of the top of the drum rotor 11, this providing for the exposure of a small section of the end of the slots 23 at that end of the drum rotor 11. A collar 164 is then fixed in place on each of the guide rods 150 below the lower plate 116 to fixedly position the base unit 102 and movable fixture 112. The blade sticks 30 are then mounted by placing each proper end of the stick in the small exposed portion of the slot 23 and fixing its other end to its cooperating retainer 118. When all of the blade sticks have been positioned, the movable fixture 112 is then lowered again after the stops 164 have been loosened. As the pin 144 engages the annular stop 27, the pin is drawn outwardly from the slot 23 to permit the blade stick end stop 132 to pass below the drum rotor. The movable fixture 112 is then lowered until the end of the blade sticks engage the annular stop 27. The compressor is then removed from the assembly fixture and mounted in place in an engine.

We claim:

1. A method of forming a compressor comprising:
   1. forming a drum rotor,
   2. placing a plurality of axial slots around the periphery of said drum rotor,
   3. aligning a stator case having fixed circumferential rows of vanes therein with said drum rotor,
   4. forming blade sticks, each having a plurality of blades along its length with an elongated root,
   5. placing each blade stick in said stator case with blades between the vanes of said stator case and with its root aligned with a slot on said drum rotor,
   6. moving said stator case and blade sticks relative to said drum rotor so that the blade roots of said blade sticks are positioned within the slots of the drum rotor.

2. A method as set forth in claim 1 wherein step 1 said drum rotor is a cylindrical member.

* * * * *